Dec. 24, 1968

E. DAVIES 3,418,582

PULSE CIRCUIT ARRANGEMENTS FOR DERIVING A LOWER
NUMBER OF PULSES PER UNIT TIME FROM A GREATER
NUMBER OF PULSES PER UNIT TIME

Filed Feb. 2, 1966

INVENTOR
Eric Davies
BY
Baldwin & Wight
ATTORNEYS

Dec. 24, 1968     E. DAVIES     3,418,582
PULSE CIRCUIT ARRANGEMENTS FOR DERIVING A LOWER
NUMBER OF PULSES PER UNIT TIME FROM A GREATER
NUMBER OF PULSES PER UNIT TIME

Filed Feb. 2, 1966     2 Sheets-Sheet 2

INVENTOR
Eric Davies
BY
Baldwin & Wight
ATTORNEYS

United States Patent Office 3,418,582
Patented Dec. 24, 1968

3,418,582
PULSE CIRCUIT ARRANGEMENTS FOR DERIVING A LOWER NUMBER OF PULSES PER UNIT TIME FROM A GREATER NUMBER OF PULSES PER UNIT TIME
Eric Davies, Danbury, Essex, England, assignor to The Marconi Company Limited, London, England, a British company
Filed Feb. 2, 1966, Ser. No. 524,549
Claims priority, application Great Britain, Feb. 18, 1965, 7,085/65
7 Claims. (Cl. 328—39)

ABSTRACT OF THE DISCLOSURE

A pulse circuit arrangement for providing, from input pulses occurring at a given number of pulses per unit of time, a desired lower number of unit pulses in said unit of time and including a source of signals occurring at said lower number per unit of time and circuit means for producing an output pulse in response only to an input pulse next following a signal occurring at said lower number per unit of time.

Figure 1:
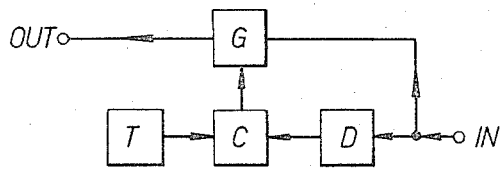

This invention relates to pulse circuit arrangements and has for its object to provide, from input pulses occurring at a given number of pulses per unit of time, a desired lower number of output pulses in said unit of time. The principal, though not the exclusive, application of the invention is to radar stations required to be used for secondary radar purposes.

There are a number of cases in which a given number of pulses per second is required to be produced from an available pulse source of higher frequency. An important case of this kind arises when a radar station is required to be used for secondary radar purposes, i.e., to interrogate targets carrying receivers and retransmitters which respond automatically to interrogating pulses from the station. At present, by international agreement, the permissible maximum number of pulses which can be transmitted from a radar station for interrogating retransmitting secondary radar targets is limited to 450/second. It may be required to arrange a radar station, provided for primary radar purposes—e.g., a surveillance radar for finding inactive (i.e., ordinary reflecting) targets—with the facility of interrogating retransmitting secondary targets. The normal pulse repetition frequency of the station, when used as a primary station, may well be considerably higher than the 450 maximum above mentioned and, in such a case, it is necessary, to comply with the international agreed maximum, to bring down the pulse frequency to be within the permissible limit. The at present usual way of dealing with this problem is simply to divide the normal pulse repetition frequency by the lowest factor which will result in a new repetition frequency below the permissible maximum but, in a great many cases, this results in a new frequency which is much lower than the permissible maximum. Suppose, for example, the normal pulse repetition frequency is 600/sec. To divide this by 2 results in a new frequency of 300/sec. which is far below the permissible maximum of 450. Accordingly the effectiveness of the station will be considerably less than if the permissible maximum of 450 were adopted. The present invention seeks to overcome this disadvantage by providing, from an available number of pulses per second, a desired lower number which can be in any, quite arbitrary, relation to the available higher number.

According to this invention a pulse circuit arrangement for providing, from input pulses occurring at a given number of pulses per unit of time, a desired lower number of output pulses in said unit of time includes a source of signals occurring at said lower number per unit of time and means for producing an output pulse in response only to each input pulse next following a signal from said source.

In one way of carrying out the invention there is provided a gate, means for applying input pulses through said gate to an output terminal, means actuated by each input pulse for closing said gate, a timing signal source of a frequency below the input frequency, and means actuated by each timing signal for reopening said gate whereby only an input pulse next following a timing signal can pass through said gate.

Preferably the gate is controlled by a control circuit to which timing signals and delayed input pulse are applied, said control circuit being operative to close the gate in response to each delayed input pulse and reopen it in response to each timing signal.

Preferably the control circuit is a binary pulse generator connected and arranged to be switched over, by a delayed input signal, from a condition in which it holds the gate open, to a condition in which it holds said gate closed, and to be switched back, by a timing signal, from the latter condition to the former condition.

In another way of carrying out the invention there is provided a control circuit having two possible states and adapted to provide a control signal when changed over from one state to the other, a timing signal source of a frequency below the input frequency, means for applying timing signals to switch over said control circuit, if in said other state, to said one state, means for applying input signals to switch over said control circuit, if in said one state, to said other state, and means for utilising each control signal to produce an output pulse. The control circuit, again, preferably a binary pulse generator. Preferably also the control signal from the control circuit is fed to a differentiating circuit adjusted to produce therefrom a triggering signal which is applied to trigger a pulse generator to produce an output pulse.

Figure 2:
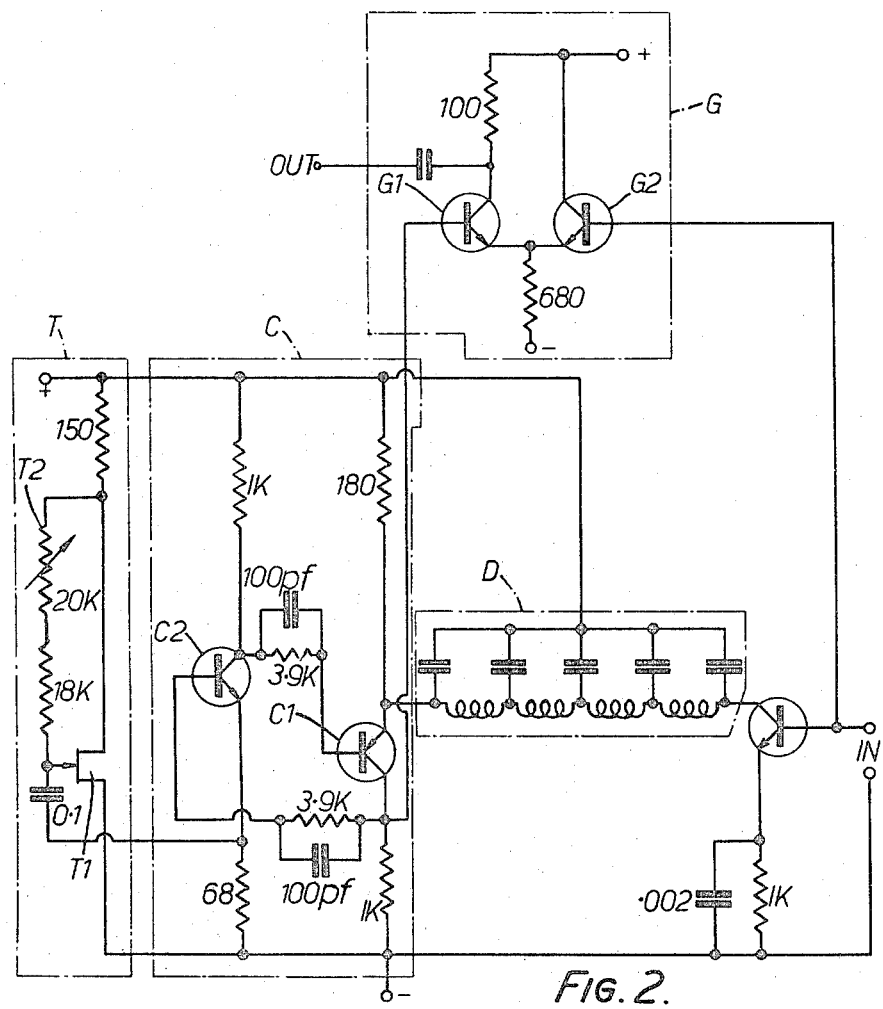
Figure 3:
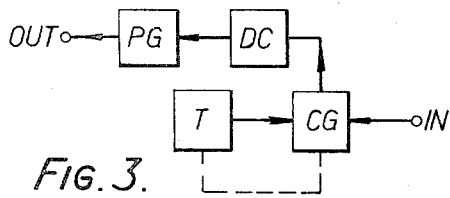
Figure 4:
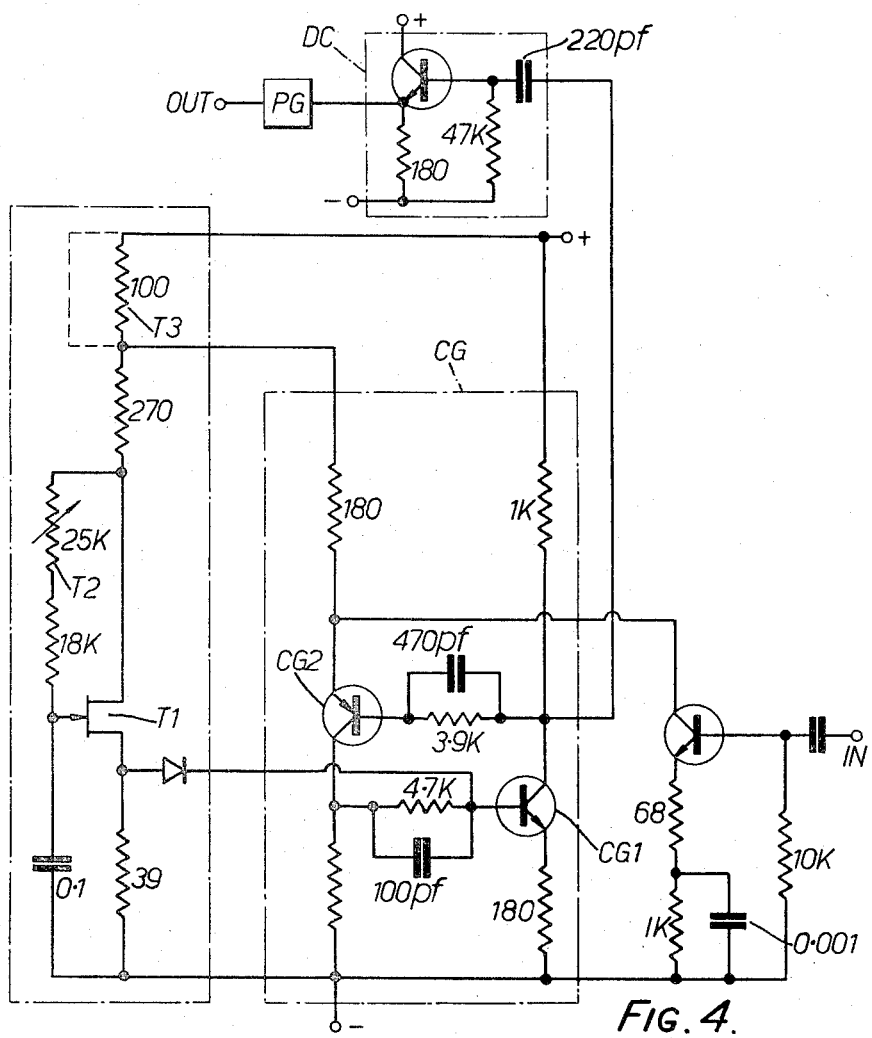

The invention is illustrated in the accompanying drawings in which FIGURE 1 is a simplified block diagram of one embodiment which is shown in circuit form in more detail in FIGURE 2 and FIGURE 3 shows another embodiment in simplified block diagram form, FIGURE 4 being a circuit diagram of the embodiment of FIGURE 3.

Referring to FIGURE 1 pulses from a pulse source (not shown) for a radio transmitter (also not shown) are applied from input terminal IN to a gate circuit G and pulses passed by this gate (when, of course, it is open) are taken off for utilisation at terminal OUT. Suppose the pulses available at IN have a pulse repetition frequency of, say, 600 pulses/sec.—a practical figure such as might well be the pulse repetition frequency of a high definition radar station installed for ordinary primary radar surveillance. Suppose it is required to use the same station also for secondary radar. As already stated the maximum permissible pulse repetition frequency for a radar transmitter to be used for this purpose is, by international agreement, only 450 pulses/second. Common present day practice in such a case would be to divide the available pulse frequency of 600 by 2 and, for secondary radar purposes, transmit at only 300 pulses/sec. This is well within the permissible maximum frequency but is also far below it and obviously a transmitter transmitting at only 300 pulses/sec. will give results which are considerably less effective and satisfactory than one transmitting at or close to the permissible maximum of 450 pulses/sec. The arrangement now to be described enables the maximum permissible pulse frequency to be obtained from any available pulse frequency, whatever its value, so long at it is higher than said maximum. As will be seen later the gate G is so controlled that it will gate out excess pulses from the pulses available at IN and pass only the required number of pulses, i.e., in the present example, 450 per second.

In FIGURE 1 pulses from IN are also fed through a delay unit D as one input to a gate control unit C which, in the present embodiment, is constituted by a binary pulse generator. The second input to the control unit C is provided by a timing pulse generator T adjusted to operate at the required permissible pulse repetition frequency, assumed to be 450 pulses/sec.

The gate G is normally open, i.e., a pulse fed to its input from IN will pass through it to the output OUT. However an input pulse at IN will be slightly delayed by the delay circuit D and set the binary pulse generator C to what is herein termed the "off" condition in which condition it closes the gate G. Now to return the generator C to the "on" condition to reopen the gate G requires the application thereto of a timing pulse from T. Accordingly, if the timing frequency is 450 only 450 pulses/sec. will be permitted to pass the gate G.

FIGURE 2 shows the arrangement of FIGURE 1 in more detail. The gate G includes two emitter coupled transistors G1 G2 and of which transistor 1 is controlled by the binary pulse generator C. This includes two transistors C1 and C2. Pulses from IN are fed through the delay line D, of form well known per se, to the emitter of C1. Pulses from the timing unit T are fed to the emitter of C2. The collector of C1 is connected to the base of G1, which is the controlled transistor of the gate G. The timing unit T is shown as of a form well known per se and includes a unijunction T1 connected in a time-constant circuit which may, for convenience, include a resistance which is adjustable (the resistance T2) to enable the timing to be adjusted to the required value.

Assume the gate G to be open. Then the first pulse from IN will pass through G to the output terminal OUT from which it may be taken as a trigger pulse to trigger off a transmitted pulse from the radar to be used for secondary radar purposes. This first pulse, delayed a little by the delay unit D, will appear a short time later at the emitter of C1 and set the binary pulse generator C to the "off" condition in which the cessation of voltage between the collector of C1 and HT, causes the transistor G1 to become nonconducting, thus shutting the gate G. Since the frequency at IN is higher than that from T, the next pulse from IN will find the gate shut and will be gated out. Shortly after this time, however, a pulse from T, applied to the emitter of C2, will change the binary pulse generator C to the "on" condition and the gate G will be opened. The next pulse from IN will therefore pass through the gate. In general terms each pulse from IN will, after a short delay set by the unit D, close the gate G and whether or not the next pulse from IN can pass the gate will depend upon whether or not a timing pulse has come from T to open said gate before said next pulse appears at IN. If therefore the timing pulse occur at 450/sec. only 450 pulses/sec. will appear at OUT.

In the somewhat simpler modification shown in FIGURES 3 and 4 the binary pulse generator, references CG in these figures, in effect combines the function of binary pulse generator and gate, and the separate delay unit D of FIGURES 1 and 2 is dispensed with. In FIGURES 3 and 4 the edge of the pulse which changes CG from the "on" condition to the "off" condition is fed from the collector of the transistor CG1 included in the unit CG to a differentiating circuit arrangement DC which produces therefrom a voltage "kick" which triggers a pulse generator PG from which output pulses are taken off at OUT for utilisation. Timing pulses from T, which is as in FIGURE 2, are fed to the base of the transistor CG1 and pulses from IN are fed as shown to the emitter of the other transistor CG2 in unit CG. An output pulse is obtained when the binary pulse generator CG is switched to the "off" condition by a pulse applied thereto from IN but it cannot be so switched unless, at the time said pulse appears at IN the unit CG has previously been switched to the "on" condition by a pulse from T. Hence again the number of output pulses/second cannot exceed the number of timing pulses/second.

In general, in the arrangement of FIGURES 3 and 4 the timing generator T will be asynchronous. If, however, as might be the case, the pulse repetition frequency at IN is a multiple of the timing frequency, the generator of the latter frequency may be, if desired, synchronised by the frequency at IN. This is illustrated in FIGURE 4 in which, if the input frequency at IN is a multiple of the desired timing frequency, negative pulses developed across the resistance T3 will synchronise the unit T. Such synchronisation will usually, however, not be required and this is indicated in FIGURE 4 by the dotted line short circuit shown across T3. In FIGURE 3 the optional provision of synchronisation (if the frequencies are suitable for it) is indicated by the dotted line link.

In both emobdiments the timing generator can be asynchronous (in FIGURES 1 and 2 it is asynchronous) and only a moderate degree of stability is required for it. In FIGURES 1 and 2 the delay provided by the unit D may be adjusted to ensure closing of the gate after the leading edge of a pulse from IN has passed therethrough or it may be adjusted to a longer time such that the gate is shut after the whole pulse has passed therethrough, as may be desired.

Practical circuit values are shown conventionally in FIGURES 2 and 4 but these are, of course, given by way of example only.

The invention is not limited to the particular arrangements described and illustrated.

I claim:
1. A pulse circuit arrangement for providing, from input pulses occurring at a given number of pulse per unit of time, a desired lower number of output pulses in said unit of time, said arrangement including a timing signal source of a frequency below the input frequency of said input pulses, and means for producing an output pulse in response only to each input pulse next following a signal from said source including a gate, means for applying input pulses through said gate to an output terminal, means responsive to input pulses for closing said gate, and means actuated by each timing signal for reopening said gate whereby only an input pulse next following a timing signal can pass through said gate.

2. An arrangement as claimed in claim 1 including means for delaying the input pulses, said means actuated by each timing signal comprising gate control circuit means for closing said gate in response to delayed input pulses from said means for delaying and for reopening said gate in response to timing signals from said timing signal source.

3. An arrangement as claimed in claim 2 wherein said gate control circuit means comprises a binary pulse generator responsive to a delayed input signal from said means for delaying the input pulses to be switched from a first condition in which said gate control circuit means holds said gate open, to a second condition in which said gate control circuit means holds said gate closed, and responsive to a timing signal from said timing signal source to be switched from said second condition to said first condition.

4. A pulse circuit arrangement for providing, from input pulses occurring at a given number of pulses per unit of time, a desired lower number of output pulses in said unit of time, said arrangement including a timing signal source of a frequency below the input frequency of said input pulses, and means for producing an output pulse in response only to each input pulse next following a signal from said source including control circuit means having first and second states for providing a control signal when changed from said first to said second state, means for applying timing signal from said timing signal source to said control circuit means to switch said control circuit means from said second to said first state, means for applying input signals to said control circuit means to switch said control circuit means, when in said first state, to said second state to produce said control signal, and means coupled to said control circuit means and responsive solely to said control signal for producing an output pulse each time said control circuit means changes from said first state to said second state.

5. An arrangement as claimed in claim 4 further including a pulse generator and wherein said means coupled with said control circuit means and responsive solely to said control signal includes a differentiating circuit responsive to each control signal for producing a triggering signal and applying said triggering signal to said pulse generator to produce an output pulse.

6. An arrangement as claimed in claim 4 wherein the control circuit is a binary pulse generator.

7. A pulse circuit arrangement for providing from input pulses occurring at a given number per unit of time, a desired lower number of output pulses in the same unit of time, said arrangement including a source of signals occurring at said lower number per unit of time, gating arrangement means controlled jointly by said input pulses and by signals from said source, said gating arrangement means being set into a first condition in response to the signals from said source in which an output pulse is produced upon the occurrence of an input pulse, and being set into a second condition in response to said input signal, in which no output signal is produced, whereby a single output pulse is produced in response only to each input pulse next following a signal from said source.

References Cited

UNITED STATES PATENTS

| 2,921,190 | 1/1960 | Fowler | 328—110 |
| 3,226,568 | 12/1965 | Samwel | 307—88.5 |
| 3,250,923 | 5/1966 | Liska et al. | 307—88.5 |

ARTHUR GAUSS, *Primary Examiner.*

S. D. MILLER, *Assistant Examiner.*

U.S. Cl. X.R.

343—6.5; 328—109, 101; 307—293, 225, 233, 247, 254, 288, 271, 283